United States Patent [19]

Gravley

[11] 3,957,938

[45] May 18, 1976

[54] PRETREATMENT OF POLYTETRAFLUOROETHYLENE FILTER BAGS

[75] Inventor: Mark L. Gravley, Oregon, Ohio

[73] Assignee: Phillips Petroleum Company, Bartlesville, Okla.

[22] Filed: Oct. 21, 1974

[21] Appl. No.: 516,481

[52] U.S. Cl. .................................. 264/85; 55/97; 55/528; 264/127; 264/342 R; 264/345; 264/DIG. 71
[51] Int. Cl.² ................ B01D 39/08; B01D 29/14; B29C 25/00
[58] Field of Search ............... 264/342 R, 127, 235, 264/346, 342 RE, 345, 85, DIG. 71; 55/DIG. 16, 96, 97, 528

[56] References Cited

UNITED STATES PATENTS

| | | | |
|---|---|---|---|
| 3,225,129 | 12/1965 | Taylor et al. | 264/342 R |
| 3,391,221 | 7/1968 | Gore et al. | 264/127 |
| 3,556,161 | 1/1971 | Roberts | 264/127 |
| 3,629,383 | 12/1971 | Kometani et al. | 264/127 |
| 3,664,915 | 5/1972 | Gore | 264/127 |
| 3,813,461 | 5/1974 | Murayama et al. | 264/342 R |

*Primary Examiner*—Jeffery R. Thurlow

[57] ABSTRACT

Polytetrafluoroethylene bags used in solids filtering units are preshrunk to preclude tearing or ripping of the bags.

3 Claims, No Drawings

PRETREATMENT OF POLYTETRAFLUOROETHYLENE FILTER BAGS

This invention relates to polytetrafluoroethylene filter bags.

In many industries there exists the problem of removing suspended solids from a stream of gas which is to be vented to the atmosphere. In some instances, it is desirable, from an economic standpoint, to recover the solids. In other instances, it is desirable, particularly in congested populated areas, to remove the solids from the vented gases to avoid atmospheric pollution. Various designs of different types of filtering equipment have been developed and are in use at the present time. One type of filtering apparatus used is that commonly called the "bag filter". The instant invention relates to such a bag filter and will be described as applied to the separation of carbon black particles from the hot effluent gas suspension coming from a carbon black furnace. However, it is to be understood that the instant invention is not to be unduly limited to such application since it can be employed in any system where it is desirous to remove solids from a gas.

Recently, several installations have installed filter bags made from polytetrafluoroethylene woven fabric. While it was expected that such bags would offer greater long-run process economy than materials used heretofore, e.g., woven glass fiber material, such polytetrafluoroethylene bags have introduced new problems. One problem is that at high temperatures the polytetrafluoroethylene bags shrink. This problem was alleviated, in part, by preshrinking the material used in manufacturing the bags. However, it was found that the bags were still subject to shrinkage, generally on the order of from 2 to about 10 percent in the longitudinal direction. Because of this shrinkage, the bags had to be further treated before use in order to avoid ripping or tearing of the bag during filtering operations.

In one such method of bag pretreatment, the bag was installed in a filter chamber at 5 to 10 pounds of longitudinal tension and a hot gas was passed through the bag at about 400°F. for about 24 hours. The bag was cooled, re-tensioned to 5 to 10 pounds and again heated, then cooled. The cycle was repeated until four cycles had been completed, then the bag was placed into filtering operation. This method was not only time-consuming, but increased the chance of tearing or ripping the bag due to an excess of tension on the bag.

Accordingly, it is an object of this invention to provide an improved method for pretreating filter bags made from a polytetrafluoroethylene woven fabric.

Other objects, aspects and advantages of this invention will be readily apparent to those skilled in the art from the reading of the following disclosure.

In accordance with the present invention, it has been discovered that a polyfluoroethylene filter bag can be dimensionally stabilized by installing the bag in a filter unit, so as to provide slack in the longitudinal direction and heating the bag at an elevated temperature for a time sufficient to ensure the desired shrinkage of the bag. The bag is thereafter cooled to ambient temperature. The resulting bag is thus in condition for use in the filtering operation.

It has been found that a single cycle, as described above, is sufficient to provide the necessary dimensional stability, in contrast to the four-cycle procedure used heretofore.

The filter bags are installed in the filter unit with 2 to about 10 percent slack in the longitudinal direction, based on the length of the filter bag. Thus, a 14-foot filter bag would be installed with from about 3.5 to about 17 inches of longitudinal slack.

The installed bags are heated to a temperature in the approximate range of 450° to 500°F for from about 20 to about 30 hours. Since the time required to effect complete or nearly complete shrinkage of the bags is largely empirical, a period of about 24 hours is generally used to ensure desired shrinkage without unduly encumbering a filter unit.

The bags are heated by passing a heated inert gas therethrough. It is desirable that the heating gas be substantially free of oxygen although small amounts of oxygen, i.e., an amount which will not support combustion, can be present. Nitrogen and carbon dioxide are but two examples of inert gases which can be employed to treat the filter bags according to this invention.

In a presently preferred embodiment, the heating gas is the flue gas from a carbon black reactor which is being operated without the oil feed.

Following the heating period, the filter unit is cooled to ambient temperature. When using a carbon black reactor flue gas, cool-down is accomplished by increasing the flow of quench water. The bags are then adjusted to provide the desired longitudinal tension. The filter unit is then suitable for use in normal carbon black filtering operation.

The method of this invention is generally applicable to filter bags formed from a fluorocarbon polymer. It is particularly applicable to bags formed from Teflon resin, a polymer of tetrafluoroethylene, which is available commercially from E. I. duPont de Nemours and Co., Inc. The filter bags are fabricated by methods presently employed in the art.

In one instance, the filter bags were formed from DuPont Teflon filter fabric, style 954, having a weave design of 3 × 1 twill, a weight of 8 oz/square yard, a thickness of 0.01 inches, and a porosity of 20 to 40 cfm per square foot at a pressure of ½ inch of water. The Teflon fabric was preshrunk by heating to a temperature of about 400°F, after which the filter bags were fabricated. The filter bags were then stabilized according to the invention procedure by:

1. installing same in a filter unit with from 3 to 8 percent longitudinal slack;
2. passing the flue gas from a carbon black reactor, said gas having a temperature in the range of 450°–500°F, through the bags for about 24 hours;
3. thereafter cooling the bags; and
4. retensioning the bags to normal operating tension.

The thus-treated filter bags were dimensionally stable, i.e., they exhibited no tendency to shrink further after being placed in filtering operation. It can be seen that the present invention provides a method for stabilizing filter bags in a much shorter time, i.e., about 24 hours, than the method of stabilization employed heretofore which required about 96 hours.

Filter bags formed from other heat-shrinkable fibers can also be treated in accordance with this invention.

Reasonable variations and modifications, which will be apparent to those skilled in the art, can be made in this invention without departing from the spirit and scope thereof.

What is claimed is:

1. A method of stabilizing a filter bag fabricated from a preshrunk woven polytetrafluoroethylene fabric, said bag having from about 2 to about 10 percent residual longitudinal shrinkage which comprises installing said bag in a filter unit with from about 2 to about 10 percent longitudinal slack based upon the length of said bag, heating said bag by passing a heated inert gas therethrough at a temperature in the approximate range of 450°–500°F for a period of about 20 to about 30 hours.

2. The method of claim 1 wherein said fabric is preshrunk by heating same at a temperature of about 400°F, said bag is installed in said filter unit with from 3 to 8 percent longitudinal slack, and said bag is heated for about 24 hours.

3. The method of claim 1 wherein said heated gas is a flue gas.

* * * * *